US011711498B2

(12) United States Patent
Guo

(10) Patent No.: US 11,711,498 B2
(45) Date of Patent: Jul. 25, 2023

(54) EFFICIENT CONJUGATE ILLUMINATION SYSTEM FOR LCD PROJECTOR AND PROJECTION METHOD THEREOF

(71) Applicant: NANHUA INTELLIGENT PRECISION MACHINE (SHENZHEN) CO., LTD., Guangdong (CN)

(72) Inventor: Hanwen Guo, Guangdong (CN)

(73) Assignee: NANHUA INTELLIGENT PRECISION MACHINE (SHENZHEN) CO., LTD., Guangdong (CN)

( * ) Notice: Subject to any disclaimer, the term of this patent is extended or adjusted under 35 U.S.C. 154(b) by 293 days.

(21) Appl. No.: 17/106,104

(22) Filed: Nov. 28, 2020

(65) Prior Publication Data

US 2021/0120215 A1    Apr. 22, 2021

(30) Foreign Application Priority Data

Nov. 4, 2020 (CN) .......................... 202011214735.6

(51) Int. Cl.
*H04N 9/31* (2006.01)
*G02F 1/1335* (2006.01)
*G03B 21/20* (2006.01)

(52) U.S. Cl.
CPC ..... *H04N 9/3167* (2013.01); *G02F 1/133528* (2013.01); *G03B 21/2033* (2013.01); *G03B 21/2066* (2013.01); *G03B 21/2073* (2013.01)

(58) Field of Classification Search
CPC ................ H04N 9/3167; H04N 9/3197; G02F 1/133528; G03B 21/006; G03B 21/2033; G03B 21/2066; G03B 21/2073; G03B 21/28; G02B 27/28
USPC ....................................................... 348/744
See application file for complete search history.

(56) References Cited

U.S. PATENT DOCUMENTS

| 11,169,432 | B2* | 11/2021 | Guo | G03B 21/2066 |
| 2002/0001135 | A1* | 1/2002 | Berman | H04N 9/3167 |
| | | | | 359/639 |
| 2006/0238716 | A1* | 10/2006 | Lee | G02B 27/123 |
| | | | | 257/E33.073 |
| 2006/0279662 | A1* | 12/2006 | Kapellner | H04N 5/7416 |
| | | | | 348/E9.027 |
| 2007/0252954 | A1* | 11/2007 | McGuire, Jr. | G03B 33/12 |
| | | | | 353/20 |

(Continued)

*Primary Examiner* — John W Miller
*Assistant Examiner* — Sean N. Haiem

(57) ABSTRACT

An efficient conjugate lighting system for an LCD projector, includes an LED light source, a square cone condenser, a collimating lens, a quarter-wave plate, a brightness-enhancing polarizer, an LCD light valve, a field lens and a projection lens which are provided in sequence according to a direction of light travel; wherein the efficient conjugate lighting system for the LCD projector further comprises a reflecting mirror provided at an entrance port of the square cone condenser; a light-transmitting surface of the entrance port of the square cone condenser is bisected along a horizontal centerline or a vertical centerline to form a first sub-light-transmitting surface and a second sub-light-transmitting surface; a light-emitting surface of the LED light source is provided on the first sub-light-transmitting surface, and the reflector is provided on the second sub-light-transmitting surface.

3 Claims, 4 Drawing Sheets

(56) References Cited

U.S. PATENT DOCUMENTS

| | | | | |
|---|---|---|---|---|
| 2009/0310042 A1* | 12/2009 | Vidal | .................... | G02B 27/283 |
| | | | | 349/8 |
| 2013/0077283 A1* | 3/2013 | Li | ........................ | H04N 9/3167 |
| | | | | 362/19 |
| 2013/0135588 A1* | 5/2013 | Popovich | ........... | G03B 21/2033 |
| | | | | 359/489.08 |
| 2016/0011353 A1* | 1/2016 | Escuti | .................... | G02B 6/105 |
| | | | | 359/15 |
| 2021/0302758 A1* | 9/2021 | Smithwick | ........... | G02B 27/283 |

\* cited by examiner

| Attribute | Grid Result | Beam Width | Smooth | Grid Data |

Error estimate

At peak value (P)　　5.51 %　　　Average　　6.32 %

Number of samples (N)　　149,164

Total luminous flux (Not smooth)

Unit (U)　　Lumen

Incident　　7621.9 Lumen　　Limited by aperture (P)

Absorbed (B)　　7621.9 Lumen　　0.00000 Lumen

Statistics based on smoothed mesh data

Illuminance

| | | | | |
|---|---|---|---|---|
| Min (M) | 6.3493e+005 Lux | Contrast ratio (C) | | 0.3714 |
| Max (X) | 1.3853e+006 Lux | Standard deviation (D) | | 1.2141e+00 |
| Ave (A) | 1.2354e+006 Lux | Average deviation (V) | | 0.09828 |

Location and extended width

Centroid
- X　−0.28977 mm
- Y　0.025945 mm

Standard deviation
- Sigma X　29.091 mm
- Sigma Y　16.962 mm

Fig. 5

EFFICIENT CONJUGATE ILLUMINATION SYSTEM FOR LCD PROJECTOR AND PROJECTION METHOD THEREOF

CROSS REFERENCE OF RELATED APPLICATION

The present application claims priority under 35 U.S.C. 119(a-d) to CN 202011214735.6, filed Nov. 4, 2020.

BACKGROUND OF THE PRESENT INVENTION

Field of Invention

The invention relates to the field of projectors, in particular to an efficient conjugate illumination system for an LCD projector and a projection method thereof.

Description of Related Arts

For a long time, since the transmissive single LCD projector is based on illuminating its liquid crystal molecules with online polarized light, bright and dark images are generated through an analyzer, and almost all the illuminating light from the light source can be regarded as natural light. Thus, during the process that natural light is polarized to be linearly polarized light, about over or equal to 50% of the light is filtered by the polarizer of the LCD light valve. Considering the extinction ratio of the LCD light valve on the polarizer, the total polarization efficiency of the polarizer is often less than or equal to a range of 38%-45%. This lighting loss alone will cause 55%-62% of the energy of a single LCD projector to do useless work, which fundamentally affects the efficiency of the optical system of a single LCD projector, and fundamentally increases the projector. The heat dissipation burden of the optical system fundamentally limits the performance and application of a single LCD projector.

In recent years, some relatively low-cost PCS (Polarization Conversion System) patented technologies are developed to improve the efficiency of the optical system, but most of the published technologies are suspected to be fake technologies: either theoretically it is almost impossible or practically ineffective, see FIG. 6 and Table 2, and these pseudo-techniques are countless, see patent application with a public number CN111399326A disclosed by our company for the analysis and summary of the existing pseudo-technology. On the basis of the company's technology (see patent applications publication numbers CN111367140A, CN111399326A), the present invention retains the characteristics of precise efficacy, further improves the characteristics of easy production, low cost and high quality, and has broader production prospects.

SUMMARY OF THE PRESENT INVENTION

In order to solve the above-mentioned technical problems, an object of the present invention is to provide a conjugate high-efficiency illuminating system for LCD projectors which are inexpensive and easy to manufacture.

Accordingly, in order to achieve the objects mentioned above, the present invention provides an efficient conjugate lighting system for an LCD projector, comprising: an LED light source (1), a square cone condenser (2), a collimating lens (3), a quarter-wave plate (4), a brightness-enhancing polarizer (5), an LCD light valve (6), a field lens (7) and a projection lens (8) which are provided in sequence according to a direction of light travel; wherein the efficient conjugate lighting system for the LCD projector further comprises a reflecting mirror (9) provided at an entrance port of the square cone condenser (2); a light-transmitting surface of the entrance port of the square cone condenser (2) is bisected along a horizontal centerline or a vertical centerline to form a first sub-light-transmitting surface and a second sub-light-transmitting surface; a light-emitting surface of the LED light source (1) is provided on the first sub-light-transmitting surface, and the reflector (9) is provided on the second sub-light-transmitting surface; wherein the light-emitting surface of the LED light source (1) and the reflector (9) are in optical conjugation along the brightness-enhancing polarizer (5).

Preferably, the reflector (9) is mounted on the LED light source (1), and the light-emitting surface of the LED light source (1) and the reflector (9) are symmetrically provided along a horizontal centerline or a vertical centerline of the light-transmitting surface the entrance port of the square cone condenser;

or the reflecting mirror (9) is provided at a sub-light-passing surface of the incident port of the square cone condenser (2).

Preferably, the brightness-enhancing polarizer (5) adopts a linear polarizer, and a transmission axis of the brightness-enhancing polarizer (5) is consistent with a polarization plane of incident polarized light required by the LCD light valve (6), the brightness-enhancing polarizer (5) transmits the linearly polarized light required by the LCD light valve (6); a reflection axis and the transmission axis of the brightness-enhancing polarizer (5) are orthogonal, and the brightness-enhancing polarizer (5) reflects linearly polarized light orthogonal to the polarization plane of the transmission axis of brightness-enhancing polarizer (5).

Preferably, a fast axis of the quarter wave plate (4) and the transmission axis of the brightness-enhancing polarizer (5) form an included angle of +45°, −45°, +135° or −135°.

Preferably, the square cone light concentrator (2) is a solid square cone light guide rod or a hollow square cone light guide rod, or a combination of the solid square cone light guide rod and the hollow square cone light guide rod.

Preferably, an incident surface of the collimating lens (3) is attached to the exit end surface of the square cone condenser (2); the collimating lens (3) is selected from the group consisting of a Fresnel lens, a plano-convex lens and a concave-convex lens.

Preferably, the quarter-wave plate (4) comprises two pieces of one-eighth wave plates to form an equivalent fast axis, and the equivalent fast axis by the two pieces of one-eighth wave plates and the transmission axis of the brightness-enhancing polarizer (5) form one included angle selected from the group consisting of +45°, −45°, +135° or −135°.

The present invention further provides a projection method by the efficient conjugate lighting system for the LCD projector, comprising steps of: emitting light by the LED light source (1), passing through the quarter wave plate (4) after being collected by the square cone condenser (2) and collimated by the collimating lens (3); reaching the brightness-enhancing polarizer (5), separating the light into polarization by the brightness-enhancing polarizer (5), transmitting a polarized light useful to the LCD light valve (6), reflecting a polarized light useless to the LCD light valve (6), wherein the two polarized lights are linearly polarized light with equal amplitude, and the vibration planes are orthogonal; the polarized light being useful to the LCD light valve (6) passing through the LCD light valve (6) and then passing through the field lens (7) and the projection lens (8), and being projected out; reflecting the polarized light that is useless to the LCD light valve (6) back by the brightness-enhancing polarizer (5), and passing the reflected light through the quarter wave plate (4), focusing by the collimating lens (3) and collecting by the square cone condenser (2), and then focusing and irradiating the reflected light on the reflector (9), and are reflecting by the reflecting mirror (9), then being collected by the square cone condenser (2) and collimated by the collimating lens (3), and then passing through the quarter wave plate (4) to reach the brightness-enhancing polarizer (5), passing the reflected light through the quarter-wave plate (4) twice, and rotating polarization plane by 90° to be in an identical direction with the brightness of the brightness-enhancing polarizer (5), so that a piece of polarized light that is useless to the LCD light valve (6) becomes useful, completing the process of polarization conversion.

The beneficial effects of the present invention are as follows.

1. In the present invention, the light-transmitting surface of the incident end of the square cone-shaped concentrator is bisected along the horizontal centerline or the vertical centerline to form two sub-light-transmitting surfaces, and the LED light source and the reflector are respectively installed on the two sub-light-transmitting surfaces, so that the LED light source and the reflector are optically conjugated along the brightness-enhancing polarizer. When the brightness-enhancing polarizer separates the natural light passing through the collimating lens, and separates the two paths of polarized light that are useful and useless for the LCD light valve, the polarized light in the useless path of polarized light will be reflected back and most of the polarized light is focused on the mirror, and enter the square cone condenser again. Since both the LED light source and the reflector are on the entrance port of the square cone condenser and are optically conjugated, the optical extension will not overflow obviously after being transmitted through the square cone condenser, and polarized light in the useless path passes through the quarter-wave plate twice in a row and then the polarization plane is rotated by 90°, making this route of polarized light that is useless for LCD light valves usable, so the projector's illuminating efficiency is significantly increased. Improved and output the same brightness compared with the conventional art. The present invention can greatly save power consumption, and actively helps reduce projector volume, noise, heat dissipation, cost and other aspects of production and experience of the users.

2. The present invention integrates the reflector on the LED light source, or integrates the reflector on the incident port of the square cone condenser, so that the present invention truly realizes a result that the installation and production during the PCS technology application process become extremely simple, which has a very positive significance for improving production efficiency and reducing product costs.

BRIEF DESCRIPTION OF THE DRAWINGS

In order to explain the embodiments of the present invention or the technical solutions in the prior art more clearly, the following will briefly introduce the drawings that need to be used in the description of the embodiments or the prior art. Obviously, the drawings in the following description are only some embodiments described in the present invention.

For those of ordinary skill in the art, other drawings can be obtained based on these drawings without creative work.

FIG. 5 is illuminance data on the LCD light valve according to the preferred embodiment of the present invention.

DETAILED DESCRIPTION OF THE PREFERRED EMBODIMENT

Figure 1:
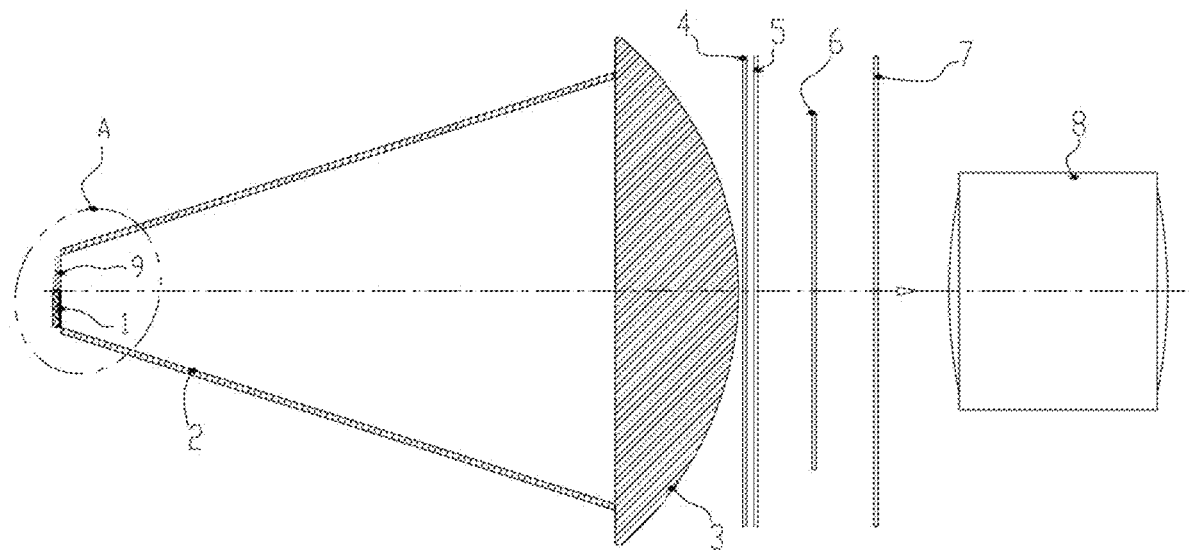
FIG. 1 is a schematic structural diagram according to a preferred embodiment of the present invention.
Figure 2:
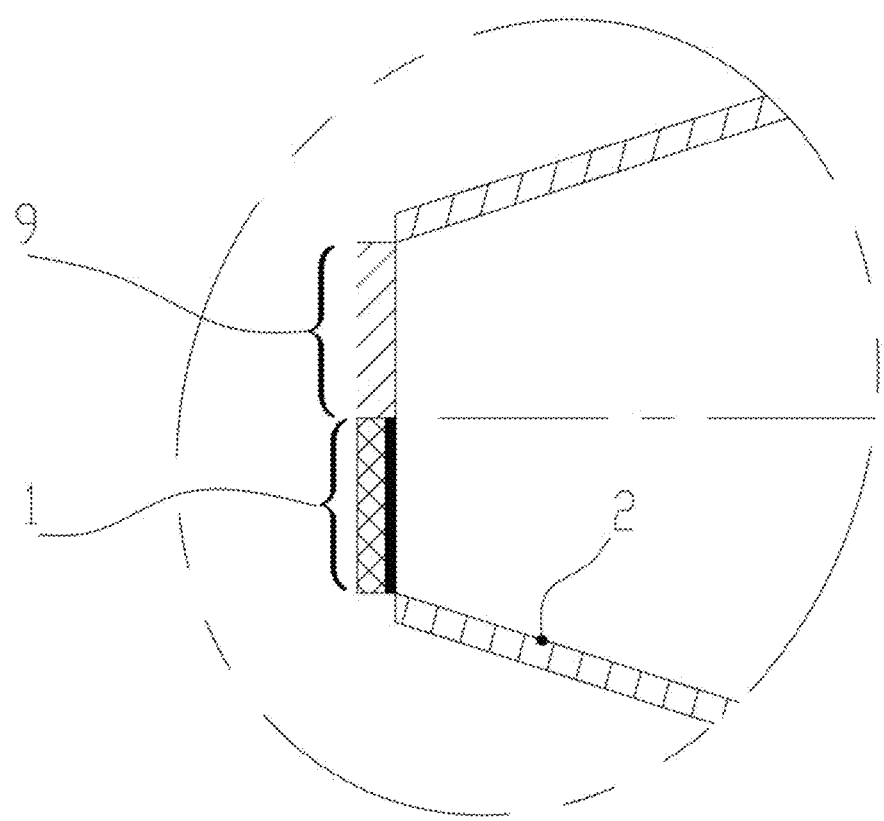
FIG. 2 is an enlarged view at a position A in FIG. 1.

In order to enable those skilled in the art to better understand the technical solutions of the present invention, the present invention will be described in detail below with reference to the accompanying drawings. The description in this section is only exemplary and explanatory and should not have any limitation on the scope of protection of the present invention.

It should be noted that similar reference numerals and letters indicate similar items in the following drawings. Therefore, once an item is defined in one drawing, it does not need to be further defined and explained in the subsequent drawings.

It should be noted that the terms "center", "upper", "lower", "left", "right", "vertical", "horizontal", "inner", "outer", etc. indicate the orientation or positional relationship: Based on the orientation or position relationship shown in the drawings, or the orientation or position relationship usually placed when the product of the invention is used, it is only for the convenience of describing the present invention and simplifying the description, and does not indicate or imply that the device or element referred to must It has a specific orientation, is constructed and operated in a specific orientation, and therefore cannot be understood as a limitation to the present invention. In addition, the terms "first", "second", "third", etc. are only used for distinguishing description, and cannot be understood as indicating or implying relative importance.

In addition, the terms "horizontal", "vertical", "overhanging" and other terms do not mean that the component is required to be absolutely horizontal or overhanging, but may be slightly inclined. For example, "horizontal" only means that its direction is more horizontal than "vertical", and it does not mean that the structure must be completely horizontal, but can be slightly inclined.

In the description of the present invention, it should also be noted that, unless otherwise clearly specified and limited, the terms "set", "install", "connected", and "connected" should be understood in a broad sense. For example, they may be fixed connections. It can also be detachably connected or integrally connected; it can be mechanically connected or electrically connected; it can be directly connected or indirectly connected through an intermediate medium, and it can be the internal communication between two components. For those of ordinary skill in the art, the specific meaning of the above-mentioned terms in the present invention can be understood under specific circumstances.

EMBODIMENT

As shown in FIGS. 1-5, the conjugate high-efficiency illumination system for LCD projectors provided by this embodiment includes LED light source 1, square cone condenser 2, collimating lens 3, quarter-quarters arranged in sequence according to the direction of light travel A wave plate 4, a brightness-enhancing polarizer 5, an LCD light valve 6, a field lens 7 and a projection lens 8, and also includes a reflector 9 arranged at the entrance port of the square cone condenser 2.

In this embodiment, the square cone-shaped concentrator 2 uses a hollow square-cone light guide rod; the two sub-transmission surfaces of the incident port of the square-cone concentrator 2 are selected to be bisected along the vertical center line of the incident port. The light-emitting surface of the LED light source 1 is located at one of the sub-light-passing surfaces, the reflector 9 is located at the other sub-light-passing surface, and the LED light source 1 and the reflector 9 are along the increased brightness polarization Plate 5 is optically conjugated.

According to the cosine emission distribution of LED light source 1 (Lambertian light emission) and the principle of square cone condenser 2, most of the main energy light emitted by LED light source 1 does not pass through the inner wall of the hollow square cone light guide rod The reflection directly reaches the collimating lens 3, and after being collimated, it passes through the quarter wave plate 4 to reach the brightness enhancement polarizer 5.

Brightness-enhancing polarizer 5 can be equivalent to a flat beam splitter to split natural light (equivalent to two linearly polarized lights with equal amplitude and orthogonal vibration planes), that is, to achieve the transmission and Reflect, produce the effect of light splitting.

Since the LED light source 1 is located on one side of the optical axis of the system, unless the light is incident on the brightness-enhancing polarizer 5 parallel to the optical axis, it must be split by the brightness-enhancing polarizer 5, according to the basic principle of reflection, the reflected light The horizontal direction (that is, the plane determined by the "vertical centerline" and "optical axis" of the entrance port of the square cone condenser 2) is mirrored, after being focused by the collimator lens 3, the aberration and distortion of the collimator lens 3 are deducted Due to various distortions, most of the reflected light separated by the brightness enhancement polarizer 5 must fall on the reflector 9. At this time, the image on the reflector 9 is the image of the LED light source, so that the reflector 9 and the LED The light source 1 is optically conjugated along the brightness enhancement type polarizing plate 5.

The non-main energy light of the LED light source 1, the overflow of the viewing square cone condenser 2 and the collimating lens 3 on the light span, and the specific installation position of the brightness enhancement polarizer 5 on the optical axis, LED light source 1 The non-primary energy light at certain exit angles is split (reflected) by the brightness-enhancing polarizer 5, and cannot reach the reflector 9, thereby basically becoming useless light; viewing the square cone condenser 2 and collimating light The quality of the design and manufacture of the lens 3, normally a large part of the above-mentioned reflected light can return to the reflector 9, because the aberration, distortion and distortion of the collimator lens 3 are controllable to a certain extent, but To realize the influence of the PCS process, some of the above-mentioned non-primary energy rays at the exit angle are not the main after all.

Regardless of software simulation or actual product testing, most of the light reflected by the brightness-enhancing polarizer 5 will reach the reflector 9 and become effective light used by the system. The positive effects of this embodiment will be further described below.

Referring to FIG. 1, when the professional software is simulated in this embodiment, a "surface receiver" is placed on the incident surface of the LCD light valve 6, and an "angle luminance meter" is placed on the "surface receiver"; The luminous flux is 10000Lm; the square cone condenser 2 uses a hollow square cone light guide rod, and the two sub-light-passing surfaces of the incident port are formed by bisecting along the vertical centerline. The incident port size is set to 18.36×10.56 mm, so the sub The size of the clear surface is 9.18×10.56 mm, the size of the exit port is 107.6×63.6 mm, the length along the optical axis is 140 mm, and the reflectivity of the inner wall is 100%; the collimating lens 3 is set as a plano-convex lens with a center thickness of 32. The material is QK2 (China), the convex spherical radius is 82.65; the quarter wave plate 4 and the brightness-enhancing polarizer 5 are integrated on a piece of glass with a thickness of 0.5, the glass material K9 (China), the incident surface of the glass is set to quarter One-wave plate 4 (set as an ideal linear retarder), the exit surface is set as a brightening polarizer 5 (set as an ideal linear polarization beam splitter), and the position of the glass entrance surface is 0.1 mm from the vertex of the exit surface of the collimator lens 3; LCD light valve 6 is a 4.5-inch light valve with a window size of 101*56.8 mm, 11 mm from the vertex of the exit surface of the collimator lens 3; the size of the reflector 9 is set to 9.18×10.56 mm, and the reflectivity is 100%. The effectiveness of this implementation is shown in Table 1 below:

| Number | Setting Conditions | Light illuminating the "surface receiver" |
|---|---|---|
| a | FIG. 1 does not set (cancel or remove) the reflector 9, quarter wave plate 4 and brightness enhancement polarizer 5, and the light-emitting surface of the LED light source 1 is 18.36 × 10.56 mm | 8704.5 Lm (Natural light, equivalent to 4352.25 Lm Linearly polarized light) |
| b | FIG. 1 does not have the reflector 9 and the quarter wave plate 4, and the light-emitting surface of the LED light source 1 is 18.36 × 10.56 mm | 5239.9 Lm (Linear polarized light) |
| c | FIG. 1 does not have the reflector 9 and the light-emitting surface of the LED light source 1 is 18.36 × 10.56 mm | 5302.1 Lm (Linear polarized light) |
| d | FIG. 1 does not have the reflector 9 and the light-emitting surface of the LED light source 1 is 9.18 × 10.56 mm, which is located on one sub-light-passing surface of the incident port of the square cone condenser 2, and the other sub-light-passing surface is idle | 5320.7 Lm (Linear polarized light) |

Row ac in Table 1 shows different technologies currently disclosed. Compared to row b, row c has a contribution of only about 1.2% (5302.1/5239.9=1.2%) to the increase in projector lighting efficiency, which can basically be ignored. Therefore, there is no substantial help to the application of the projector PCS technology, such as the technology used in China Publication No. CN110174809A.

The d-th row in Table 1 indicates the size of the light-emitting surface of the LED light source 1, which has a very limited impact on the prior art. Compared with rows d and c, it is only about 0.3%.

In the e-th row of Table 1, the linearly polarized light reaching the incident surface of the LCD light valve 6 reaches 7621.9Lm. Compared with the c-th row, the optical efficiency of the projector can be no less than 140% (7621.9 Lm/5302.1Lm=144%). In practice, the polarized light transmittance of the LCD light valve 6 is about 13%, and the output light of the projector is about 720Lm. Under the same conditions, the current line c technology, the output light of the projector is only 500Lm.

It can be seen that through this embodiment, the lighting efficiency of the projector is greatly improved, and the same brightness is output compared with the existing technology. This embodiment can greatly save power consumption and reduce the volume, noise, heat dissipation, and cost of the projector. Active help in every aspect of production and user experience.

In Table 1, if the incident port of the square cone condenser 2 is divided by the horizontal center line, and the LED light source 1 and the reflector 9 are each installed on a sub-light-passing surface, the surface receiver on the incident surface of the LCD light valve 6 The resulting luminous flux is 7645.3Lm (linearly polarized light), but this application is used in actual products, the LED light source 1 is arranged in a long strip (length-to-width ratio is about 3.5:1), in terms of efficient design and application of the light source area allowed by the light spread, The square cone condenser 2 is divided along the vertical centerline to obtain more freedom of layout of the LED chip than the horizontal centerline.

Figure 3:
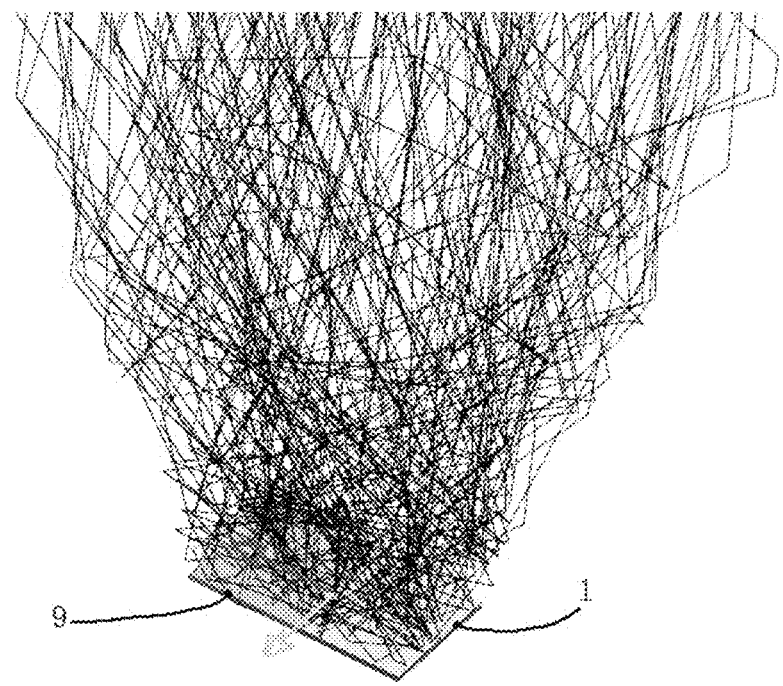
FIG. 3 is a partial schematic diagram of ray tracing according to the preferred embodiment of the present invention.

FIG. 3 is a partial screenshot of the optical conjugate display of the LED light source 1 and the reflector 9 and light tracing in this embodiment (the square cone condenser 2 is hidden in the figure). The LED light source 1 and the reflector 9 are in a square cone. The vertical center line of the light-transmitting surface at the incident end of the concentrator 2 is arranged symmetrically. Through the analysis of various solid angles of the light source, most of the light reflected by the brightening polarizer 5 is focused on the reflector 9, thus Used by the system.

Figure 4:
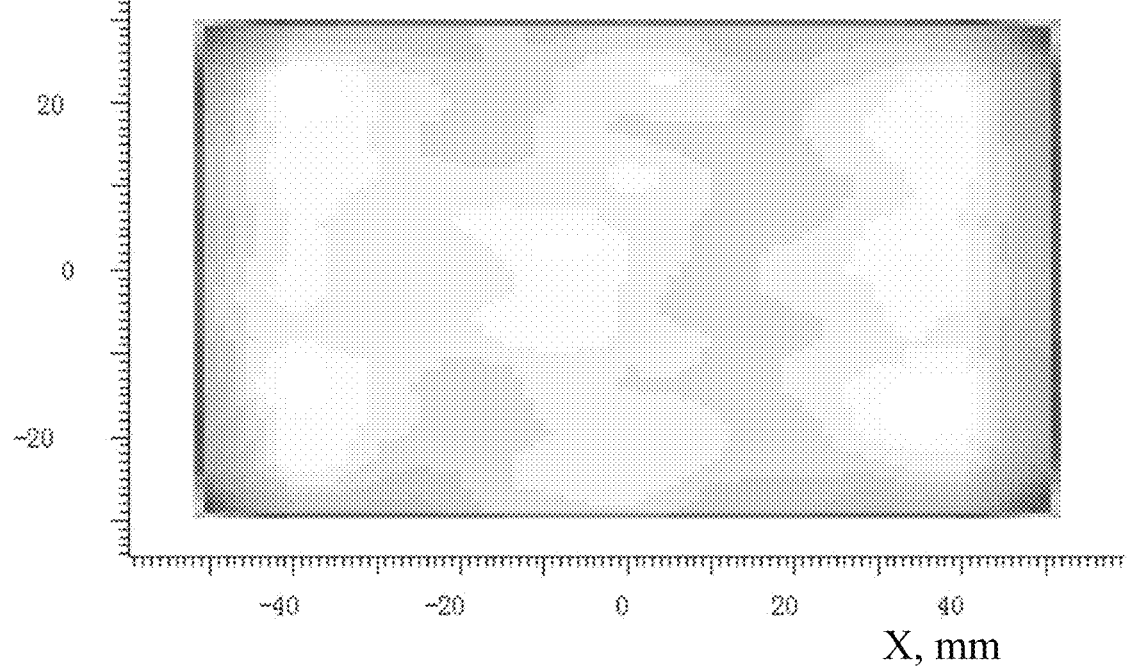
FIG. 4 is a diagram of an illuminance distribution on the LCD light valve according to the preferred embodiment of the present invention.

FIG. 4 shows the illuminance distribution of the surface receiver on the incident surface of the LCD light valve 6 (approximately 4.4-4.5 inches) of the present embodiment. The uniformity is very good, and the aperture angle is also very limited.

FIG. 5 shows several typical illuminance data of the surface receiver on the incident surface of the LCD light valve 6, which can quantify the uniformity of the projection image for the illuminance distribution of FIG. 4. Usually, serious optical design and production, the actual results and the design agreement is extremely high.

Figure 6:
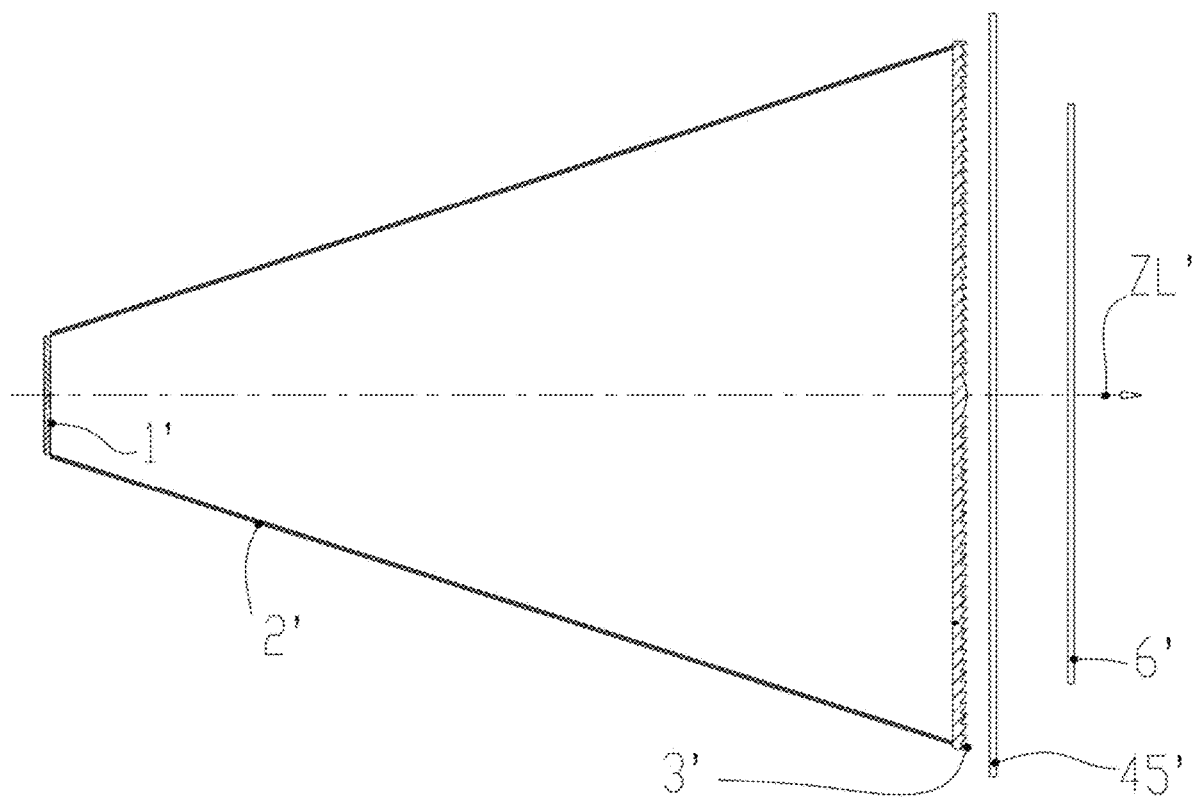
FIG. 6 is a schematic structural diagram of a prior art.

In recent years, pseudo-technology in the industry, especially some invisible pseudo-technology, has been proliferating. As shown in FIG. 6, in the direction of light travel, that is, the direction of the optical axis ZL', LED light sources 1' and hollow square cone condensers 2' are arranged in sequence. Collimating lens 3', light splitting and phase plate 45', LCD light valve 6'; the incident surface of the light splitting and phase plate 45' is a quarter wave plate, and the exit surface is a brightening polarizer, and the quarter The fast axis of the one-wave plate and the transmission axis angle of the brightness-enhancing polarizer are 45°.

In FIG. 6, the light-emitting surface of the LED light source 1' is set to 18.36×10.56 mm, and the luminous flux is 10000Lm; the hollow square cone condenser 2' sets the entrance port size to 18.36×10.56 mm, and the exit port size is 107.6×63.6 mm. The length of the optical axis ZL' direction is 140 mm, and the reflectivity of the inner wall is 100%; the collimating lens 3' is set to a Philippine lens with a thickness of 2 mm and a focal length of 142 mm, made of PMMA, tooth depth and ring pitch are both 0.3 mm, and the tooth profile is standard Teeth, the tooth surface faces the LCD light valve 6; the light-emitting surface of the LED light source 1' is mounted on the incident port of the hollow square cone condenser 2', and the incident surface of the collimating lens 3' is fitted on the hollow square cone condenser. Installation of the exit port of the device 2'; the beam splitting and phase plate 45' has a thickness of 0.5 mm, the material is K9, and the distance between the incident surface and the exit surface of the collimator lens 3' is 4 mm; the LCD light valve 6' is a 4.5-inch light valve, window The size is 101*56.8 mm, and the distance from the exit surface of the collimating lens 3' is 11 mm.

In FIG. 6, during the optical simulation, a "surface receiver" is placed on the incident surface of the LCD light valve 6', and an "angle luminance meter" is placed on the "surface receiver". The actual effects of these existing technologies are shown below Table 2 shows:

TABLE 2

| | | |
|---|---|---|
| | Actual effects of existing technologies | |
| Numbers | Setting conditions | Light illuminating the "surface receiver" |
| ① | Conditions as shown in FIG. 6 | 4705.3 Lm (linearly polarized light), Fno (aperture) about 2.9 |
| ② | In FIG. 6, the beam splitter and phase plate 45' is rotated 1° in the vertical direction of its light-passing surface to make it an angle of 89° or 91° with ZL' | 4766.5 Lm (linearly polarized light), the light spread obviously overflows, and the Fno drops from 2.9 to 2.4 |
| ③ | In FIG. 6, the beam splitter and phase plate 45' is rotated by 2° in the vertical direction of its light-passing surface, so that it forms an angle of 88° or 92° with ZL' | 4918.2 Lm (linearly polarized light), the light spread further overflows, and the Fno drops to 2.0 |

TABLE 2-continued

Actual effects of existing technologies

| Numbers | Setting conditions | Light illuminating the "surface receiver" |
|---|---|---|
| ④ | In FIG. 6, the beam splitter and phase plate 45' is rotated 1° in the horizontal direction of its light-passing surface to make it an angle of 89° or 91° with ZL' | 4739.9 Lm (linearly polarized light), Fno Down from 2.9 to 2.4 |
| ⑤ | In FIG. 6, the beam splitter and phase plate 45' is rotated by 2° in the horizontal direction of its light-passing surface, so that it forms an angle of 88° or 92° with ZL' | 4833.4 Lm (linearly polarized light), Fno Down to 2.0 |
| ⑥ | In FIG. 6, the beam splitter and phase plate 45' is rotated by 2° in the horizontal and vertical directions of its light-passing surface, so that it and ZL' form an angle of 88° or 92° in the horizontal and vertical directions. | 5004.9 Lm (linearly polarized light) Fno 2.0 |

In Table 2, by setting the angles of the beam splitter and the phase plate 45' according to the conditions ②-⑤, it can be seen that the light irradiated on the incident surface of the LCD light valve 6' can be increased slightly.

Suppose the Fno of the projector lens is 2.9, matching the illumination shown in FIG. 6, then:

In the condition of number ① in Table 2, linearly polarized light 4705.3Lm is irradiated on the LCD light valve 6', and the projector output light is about 442Lm.

According to the condition of serial number ②, in fact, the Fno of the original light 4705.3Lm (serial number ①) is not affected, and the newly added light of 4766.5-4705.3=61.2Lm cannot be used by the Fno2.9 lens at all. The amount of light has no effect, so the output of the projector is still about 442Lm, that is to say, the technology of condition ② has no effect.

Then set the Fno of the projector lens to 2.4, matching the illumination shown in FIG. 6, then:

In Table 2, the number ② condition theoretical calculation can output light flux about 448Lm; considering the use of Fno2.4 for off-axis light, the number ① condition itself can output light flux about 515Lm, and the number ② condition is because of the aforementioned excess 61.2Lm The light is available, and the light output is about 520Lm, and 520/515Lm=1%, so even if the lens Fno is increased by 2.4 regardless of the cost, the increased brightness can be almost ignored.

For a Fno 2.4 and 2.9 lens, the difference is very large in terms of cost, image quality, diameter, weight, assembly accuracy requirements, etc. The smaller the Fno of the lens, the more difficult it is to make. Therefore, the technology in FIG. 6 is improved by the inventions ②-⑥ in Table 2, adding a little weak light. Because of the obvious overflow of the light spread, it brings a lot of stringent requirements on the Fno parameters of the projector lens. These invisible The pseudo-techniques and inventions are completely contrary to the facts of science and basic engineering.

It should be noted that in this article, the terms "include", "include" or any other variants thereof are intended to cover non-exclusive inclusion, so that a process, method, article or device including a series of elements not only includes those elements, It also includes other elements not explicitly listed, or elements inherent to the process, method, article, or equipment.

Specific examples are used in this article to illustrate the principle and implementation of the present invention. The description of the above examples is only used to help understand the method and core idea of the present invention. The above are only the preferred embodiments of the present invention. It should be pointed out that due to the limited expression of words, there are objectively unlimited specific structures. For those skilled in the art, without departing from the principle of the present invention, Several improvements, modifications or changes can also be made, or the above technical features can be combined in an appropriate manner; these improvements, modifications or combinations, or the concept and technical solution of the invention are directly applied to other occasions without improvement, All should be regarded as the protection scope of the present invention.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An efficient conjugate lighting system for an LCD projector, comprising: an LED light source (1), a square cone condenser (2), a collimating lens (3), a quarter-wave plate (4), a brightness-enhancing polarizer (5), an LCD light valve (6), a field lens (7) and a projection lens (8) which are provided in sequence according to a direction of light travel; wherein the efficient conjugate lighting system for the LCD projector further comprises a reflecting mirror (9) provided at an entrance port of the square cone condenser (2); a light-transmitting surface of the entrance port of the square cone condenser (2) is bisected along a horizontal centerline or a vertical centerline to form a first sub-light-transmitting surface and a second sub-light-transmitting surface; a light-emitting surface of the LED light source (1) is provided on the first sub-light-transmitting surface, and the reflector (9) is provided on the second sub-light-transmitting surface; wherein the light-emitting surface of the LED light source (1) and the reflector (9) are in optical conjugation along the brightness-enhancing polarizer (5);

wherein a projection method by the efficient conjugate lighting system for the LCD projector comprising steps of: emitting light by the LED light source (1), passing through the quarter wave plate (4) after being collected by the square cone condenser (2) and collimated by the collimating lens (3); reaching the brightness-enhancing polarizer (5), separating the light into polarization by the brightness-enhancing polarizer (5), transmitting a polarized light useful to the LCD light valve (6), reflecting a polarized light useless to the LCD light valve (6), wherein the two polarized lights are linearly polarized light with equal amplitude, and the vibration planes are orthogonal; the polarized light being useful to the LCD light valve (6) passing through the LCD light valve (6) and then passing through the field lens (7) and the projection lens (8), and being projected out; reflecting the polarized light that is useless to the LCD light valve (6) back by the brightness-enhancing polarizer (5), and passing the reflected light through the quarter wave plate (4), focusing by the collimating lens (3) and collecting by the square cone condenser (2), and then focusing and irradiating the reflected light on the reflector (9), and are reflecting by the reflecting mirror (9), then being collected by the square cone condenser (2) and collimated by the collimating lens (3), and then passing through the quarter wave plate (4) to reach the brightness-enhancing polarizer (5), passing the reflected light through the quarter-wave plate (4) twice, and rotating polarization plane by 90° to be in an identical direction with the brightness of the brightness-enhancing polarizer (5), so that a piece of polarized light that is useless to the LCD light valve (6) becomes useful, completing the process of polarization conversion;

wherein the square cone condenser (2) is a solid square cone light guide rod or a hollow square cone light guide rod, or a combination of the solid square cone light guide rod and the hollow square cone light guide rod; and wherein an incident surface of the collimating lens (3) is attached to the exit end surface of the square cone condenser (2).

2. The efficient conjugate lighting system for an LCD projector, as recited in claim 1, wherein the collimating lens (3) is selected from the group consisting of a Fresnel lens, a plano-convex lens and a concave-convex lens.

3. The efficient conjugate lighting system for an LCD projector, as recited in claim 1, wherein the quarter-wave plate (4) comprises two pieces of one-eighth wave plates to form an equivalent fast axis, and the equivalent fast axis by the two pieces of one-eighth wave plates and the transmission axis of the brightness-enhancing polarizer (5) form one included angle selected from the group consisting of +45°, −45°, +135° or −135°.

* * * * *